(No Model.) 2 Sheets—Sheet 1.

D. G. LANDES.
MACHINE FOR CUTTING FODDER.

No. 534,478. Patented Feb. 19, 1895.

WITNESSES:
F. Norman Dixon
Thomas K. Lancaster

INVENTOR
Daniel G. Landes
By his Attorneys,
Wm. C. Strawbridge
B. Bonsall Taylor (No Model.) 2 Sheets—Sheet 2.
D. G. LANDES.
MACHINE FOR CUTTING FODDER.

No. 534,478. Patented Feb. 19, 1895.

Daniel G. Landes
INVENTOR
By his Attorneys
Wm C. Strawbridge
Bonsall Taylor

WITNESSES:
Thos. K. Lancaster.
J. Norman Dixon

UNITED STATES PATENT OFFICE.

DANIEL G. LANDES, OF GRATER'S FORD, PENNSYLVANIA.

MACHINE FOR CUTTING FODDER.

SPECIFICATION forming part of Letters Patent No. 534,478, dated February 19, 1895.

Application filed May 25, 1894. Serial No. 512,411. (No model.)

*To all whom it may concern:*

Be it known that I, DANIEL G. LANDES, a citizen of the United States, residing at Grater's Ford, in the county of Montgomery and State of Pennsylvania, have invented an Improvement in Machines for Cutting Fodder, of which the following is a specification.

My invention relates to apparatus for the reduction or subdivision of fodder to render it better adapted for consumption by domestic animals, and it is the object of my apparatus to so construct and arrange an apparatus of this character that it may be readily thrown into and out of operation and that the members of the pair of feed rolls may be readily separated at will.

In the accompanying drawings I show, and herein I describe a good form of a convenient embodiment of my invention, the particular subject-matter claimed as novel being hereinafter definitely specified.

Figures 1, 2:
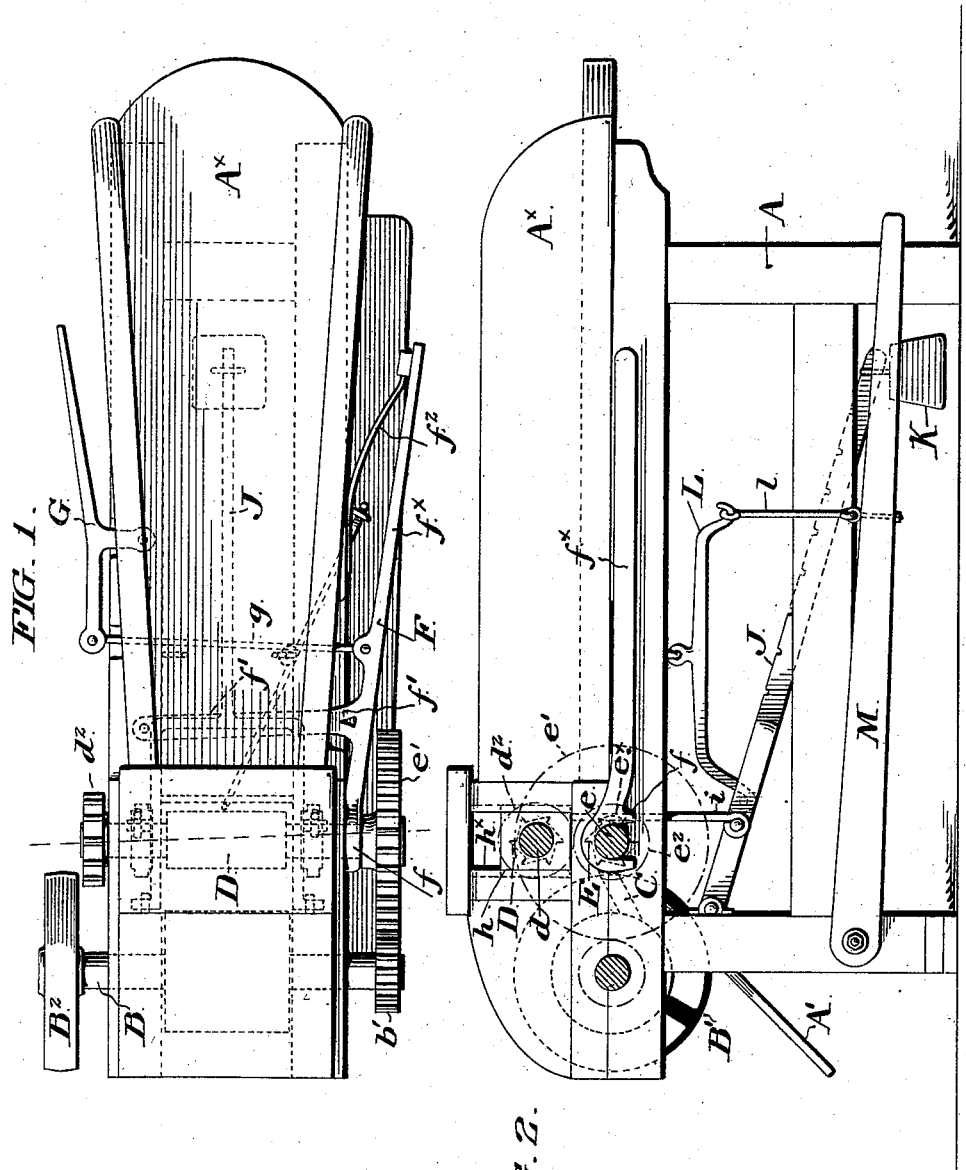
Figure 3:
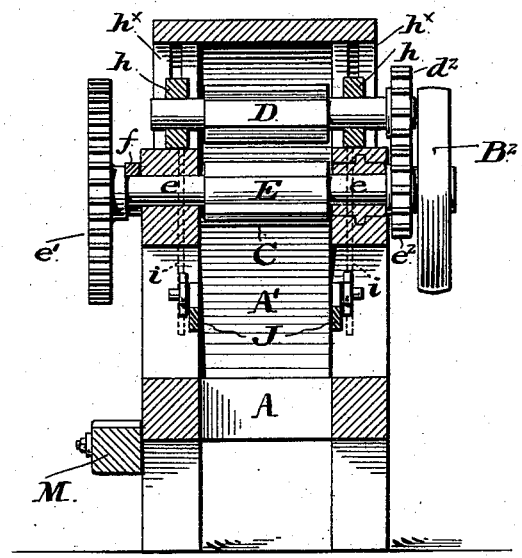
Figure 4:
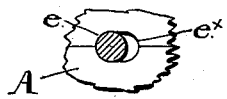

In the accompanying drawings Figure 1 is a view in top plan, and Fig. 2 a view in side elevation, of the said apparatus. Fig. 3 is a central, vertical, transverse, sectional elevation, of the apparatus. Fig. 4 is a view in detail of one end of the shaft $e$, and the horizontally elongated opening $e^x$ in which one end of said shaft has its bearing.

In the drawings, A represents a supporting frame-work or standard of any desired character. B is a cutter shaft, mounted in said frame-work, equipped with a cutting cylinder B' of an ordinary character which works against a ledger blade C,—and preferably also equipped with a fly wheel B² as shown. The cutting cylinder and ledger blade together constitute the cutting mechanism in and by which the desired reduction of the fodder is effectuated.

A× is a horizontal chute or way disposed upon the top of the standard A, along which chute fodder to be cut is advanced to the cutting mechanism.

A' is an apron or delivery chute disposed beneath the cutting mechanism, upon which the reduced or subdivided fodder drops and by which it is, in its descent, deflected outwardly away from the machine.

$d$, $e$, are a pair of shafts disposed in parallelism one above the other, between the inner end of the chute A× and the cutting mechanism, and mounted upon or formed as a part of which shafts are feed rolls D E, being cylindrical bodies provided with teeth or corrugations of any usual character adapted to enable them to take a strong hold upon the fodder. The function of the feed rolls, which are to be rotated in unison, is, as is well understood, to receive between them the uncut fodder advanced along the chute A×, and to feed said fodder regularly and unyieldingly to the cutting mechanism.

Rotation is to be positively imparted to the feed roll shaft $e$ in any desired manner, either manually or by power, and rotation thus imparted to said shaft $e$ is, through gears $e'$ $b'$, transmitted to the cutter shaft,—and, through the gears $e^2$ $d^2$ transmitted to the upper feed roll shaft $d$.

In the organization and mounting of my improved apparatus, that end of the feed roll shaft $e$ which carries the driving gear wheel $e'$ which is in mesh with the driven gear wheel $b'$ on the cutter shaft,—is mounted in an opening $e^x$ in the frame-work, which opening is oblong as opposed to being circular in transverse section, and is disposed with its major axis in a horizontal plane,—with the result that said shaft is free to be moved laterally along said opening. In this movement said shaft $e$ carries its gear wheel $e'$ into and out of engagement with the gear wheel $b'$.

Whenever, therefore, it is desired to throw the cutting mechanism out of operation, the said shaft $e$ may be drawn rearwardly to carry its driving gear wheel $e'$ out of engagement with the driven gear wheel $b'$ through which rotation is ordinarily imparted to the cutter wheel.

Any preferred mechanism may be employed to occasion the rearward movement of the shaft $e$. In the drawings I show as employed for this purpose the following devices:

F is a bell crank lever, the inner end of which is provided with a fork or hook $f$ which embraces the shaft $e$, the handle end $f^x$ of which bell crank lever extends along the side of the standard A so as to be readily accessible by the operator, and the fulcrum member $f'$ of which lever is pivotally engaged with any selected portion of the frame-work of the machine.

$f^2$ is a flat spring secured to the side of the standard A, the free extremity of which is secured to the handle portion $f^\times$ of the bell crank lever, and tends to constantly force said lever outward, to hold the gears $e'$ $b'$ in engagement with each other.

As will be apparent, upon the forcing inward of the handle $f^\times$ of said bell crank lever, against the stress of the spring, the shaft $e$ with its gear wheel $e'$ will be drawn rearwardly and out of engagement with the gear $b'$.

In order to enable the rearward movement of the shaft $e$ to be effected from the farther side of the machine, or the side opposite to that upon which the bell crank lever F is disposed, I provide an auxiliary bell crank lever, G, pivotally mounted on the frame-work A upon said farther side of the machine, and connected by a link $g$ with the bell crank lever F.

The mechanism by virtue of which the feed rolls may be separated, is as follows:

The upper feed roll shaft $d$ is journaled in boxes $h$ which are free to slide in vertical ways $h^\times$, with the result that the feed roll shaft $d$ may be elevated at will to open or increase the breadth of the pass of said rolls.

$i$ are rods which depend from the boxes $h$, the lower extremities of which rods are pivotally engaged with the intermediate portion of a weight arm J, the inner end of which is pivotally attached to the frame-work, and the free extremity of which is provided with a weight K, which weight constantly tends, through said arm J, rods $i$, and boxes $h$, to draw and hold said shaft $d$ down with its driven gear wheel $d^2$ in bite with the driving gear wheel $e^2$. The arm J is provided with a series of notches in any one of which the weight K may be engaged, so that the stress of said weight may be graduated at will.

L is a lever arm pivotally attached to the frame-work of the machine, engaged as to its inner end with the arm J, and as to its outer end connected by a link $l$ with a foot lever M placed at the side of the machine in proximity to the floor so as to be readily accessible to the foot of the operator. As will be obvious, depression of said foot lever will, through the link $l$, lever L, arm J, and rods $i$, occasion the elevation of the boxes $h$ and shaft $d$ with its feed roll and driven gear wheel.

The arrangement described, by virtue of which the upper feed roll may be carried away from the lower feed roll, is of great utility, inasmuch as in the practical operation of machines of this character it has been found that the feed rolls frequently become choked or blocked by the engagement between them of a greater mass of material than their "pass" or capacity permits, with the result that the wedged-in material cannot be advanced and can only be retracted with great difficulty. In my apparatus, as will be understood, a mass of material thus entering the space between the feed rolls and becoming wedged therein, may be readily released by the elevation of the upper feed roll.

Having thus described my invention, I claim—

1. In an apparatus for cutting fodder, in combination, a supporting standard, cutting mechanism, means for operating said cutting mechanism, a pair of feed rolls, gears by which said feed rolls are caused to rotate in unison, a pair of boxings mounted in vertical slide ways in which boxings one of said rolls is journaled, a foot lever, and mechanism connecting said foot lever and said boxings,—substantially as set forth.

2. In an apparatus for cutting fodder, in combination, a supporting standard, cutting mechanism, means for operating said cutting mechanism, a pair of feed rolls, gears by which said feed rolls are caused to rotate in unison, a pair of boxings mounted in vertical slide ways, in which boxings one of said feed rolls is journaled, a weighted arm, connected with said boxings, by which said boxings are normally held down to the limit of their movement,—a lever, and mechanism connecting said lever and said weighted arm,—the arrangement being such that the throw of the lever occasions the elevation of the weighted arm and of the slide boxings,—substantially as set forth.

In testimony that I claim the foregoing as my invention I have hereunto signed my name this 23d day of May, A. D. 1894.

DANIEL G. LANDES.

In presence of—
J. BONSALL TAYLOR,
F. NORMAN DIXON.